US006980208B1

(12) United States Patent
Montrym et al.

(10) Patent No.: US 6,980,208 B1
(45) Date of Patent: Dec. 27, 2005

(54) SYSTEM AND METHOD FOR ENHANCING DEPTH VALUE PROCESSING IN A GRAPHICS PIPELINE

(75) Inventors: John Montrym, Cupertino, CA (US); Jonah M. Alben, San Jose, CA (US); Sean Treichler, Mountain View, CA (US); John M. Danskin, Cranston, RI (US); Gary Tarolli, Concord, MA (US)

(73) Assignee: NVIDIA Corporation, Santa Clara, CA (US)

( * ) Notice: Subject to any disclaimer, the term of this patent is extended or adjusted under 35 U.S.C. 154(b) by 675 days.

(21) Appl. No.: 10/234,977

(22) Filed: Sep. 3, 2002

(51) Int. Cl.[7] .............................................. G06T 15/00
(52) U.S. Cl. ................................................... 345/422
(58) Field of Search ................................. 345/422, 426

(56) References Cited

U.S. PATENT DOCUMENTS

| | | | | |
|---|---|---|---|---|
| 5,509,110 A | * | 4/1996 | Latham | 345/421 |
| RE38,078 E | * | 4/2003 | Duluk, Jr. | 345/422 |
| 6,559,851 B1 | * | 5/2003 | Schlapp | 345/531 |
| 6,646,639 B1 | * | 11/2003 | Greene et al. | 345/422 |
| 6,724,394 B1 | * | 4/2004 | Zatz et al. | 345/581 |

OTHER PUBLICATIONS

McCormack et al., "Neon: A Sigle-Chip 3D Workstation Graphics Accelerator", 1998, ACM, pp. 123-132.*
Apgar et al., "A Display System for the Stellar Graphics Supercomputer Model GS1000", 1988, ACM, pp. 255-262.*
Deering et al., "The SAGE Graphics Architecture", 2002, ACM, pp. 683-692.*
Kirk et al., "The Rendering Architecture of the DN1000VS", Aug., 1990, ACM, pp. 299-307.*
Schmittler et al., "SaarCOR—A Hardware Architecture for Ray Tracing", 2002, The Eurographics Association, pp. 27-36, 155.*
Deering et al., "FBRAM: A new Form of Memory Optimized for 3D Graphics", Jul., 1994.*
Akely, "Reality Engine Graphics", 1993, ACM, pp. 109-116.*
Montrym et al., "InfiniteReality: A Real-Time Graphics System", Aug., 1997.*
Bartz et al., "Extending Graphics Hardware For Occlusion Queries In OpenGL", 1998, ACM, pp. 97-104.*

* cited by examiner

Primary Examiner—Almis R. Jankus
(74) Attorney, Agent, or Firm—Zilka-Kotab, PC

(57) ABSTRACT

A system, method and computer program product are provided for performing depth testing and blending operations in a first mode and a second mode. In the first mode, a circuit processes a first number (m) of first pixels per clock cycle, each of the first pixels including both color values and depth values. In the second mode, the circuit processes a second number (n) of second pixels per clock cycle. Each of the second pixels includes the depth values and not the color values. Further, the second number (n) is greater than the first number (m).

59 Claims, 5 Drawing Sheets

SYSTEM AND METHOD FOR ENHANCING DEPTH VALUE PROCESSING IN A GRAPHICS PIPELINE

FIELD OF THE INVENTION

The present invention relates to computer graphics, and more particularly to pixel processing in a graphics pipeline.

BACKGROUND OF THE INVENTION

Prior Art FIG. 1 illustrates an exemplary portion of a graphics pipeline 100, in accordance with the prior art. As shown, a rasterizer 102 is provided. In general, the rasterizer 102 identifies pixels which belong to a primitive being considered. One particular function of the rasterizer 102 shown in FIG. 1 is the generation of depth values. Associated therewith is at least one color value processor 104 coupled to the rasterizer 102. In use, the color value processor 104 is capable of generating color values.

Coupled to the rasterizer 102 is a first-in-first-out (FIFO) buffer 106 for buffering the depth values. Also included is a circuit 108 coupled to the color value processor 104 and further coupled to the FIFO buffer 106. As shown, the circuit 108 includes a pre-raster operation processor including a plurality of modules.

A first set of such pre-raster operation processor modules 110 is capable of processing only depth values. In particular, such modules 110 may be capable of performing depth testing, culling, etc. in preparation for additional similar processing utilizing the raster operation processor 116. A second set of such pre-raster operation processor modules 111 is capable of processing only color values. Just by way of example, the modules 111 may perform address translation, dithering, coverage operations, alpha operations, blending operations, etc. in preparation for additional similar processing utilizing the raster operation processor 116. In the context of the present description, a raster operation may include any fragment operations [e.g. operations that can update the frame buffer, based on upcoming and previously stored data, such as depth data, etc. (See OpenGL® Specification)].

Thus, a predetermined fixed bandwidth is allocated for processing the depth values via the rasterizer 102, FIFO buffer 106, and the associated pre-raster operation processor modules 110. Similarly, a predetermined fixed bandwidth is allocated for processing the color values via the color value processor 104 and the associated pre-raster operation processor modules 111.

Unfortunately, such fixed bandwidth framework does not utilize the processing capabilities of the graphics pipeline 100 in the most effective manner. For example, the color value processing may be disabled or not required for a particular pixel(s) during which the color value processor 104 and the associated pre-raster operation processor modules 111 remain idle. At the same time, the processing of the depth values may be lagging due to the limited resources of the rasterizer 102, FIFO buffer 106, and the associated pre-raster operation processor modules 110.

There is thus a need for a technique of processing depth values in a graphics pipeline in the most effective manner.

DISCLOSURE OF THE INVENTION

A system, method and computer program product are provided for performing depth testing and blending operations in a first mode and a second mode. In the first mode, a circuit processes a first number (m) of first pixels per clock cycle. Each of the first pixels includes both color values and depth values. In the second mode, the circuit processes a second number (n) of second pixels per clock cycle. Each of the second pixels includes the depth values and not the color values. Further, the second number (n) is greater than the first number (m).

In one embodiment, the circuit may include a pre-raster operation processor and a raster operation processor. Moreover, the circuit may include a plurality of modules. A portion of such modules may be capable of processing both the depth values and the color values. Optionally, multiplexers may selectively feed the portion of the modules capable of processing both the depth values and the color values.

In another embodiment, the color values may be generated by a color value processor in communication with the circuit. Further, the depth values may be generated by a rasterizer in communication with the circuit. As an option, the depth values may be buffered in a first-in-first-out (FIFO) buffer in communication with the rasterizer and the circuit. Still yet, the color values and the depth values may be outputted to graphics memory in communication with the circuit.

Optionally, the circuit may include a plurality of buffers for accumulating the depth values and the color values. Such buffers may be further capable of writing the depth values and the color values from a plurality of groups (e.g. "quads") to memory as a single block.

In still another embodiment, the second number (n) may be twice or greater than twice the first number (m). Of course, the second number (n) may be greater than the first number (m) by any desired factor. Moreover, in the second mode, no color values may be outputted. Still yet, a software driver may govern whether the circuit is operating in the first mode or the second mode.

Another system, method and computer program product are provided including a rasterizer capable of generating depth values and a color value processor coupled to the rasterizer. In use, the color value processor is capable of generating color values. Moreover, the system operates in a first mode and a second mode. In the first mode, a first number (m) of pixels per clock cycle is processed. Each of such pixels includes a depth value and a color value. In the second mode, a second number (n) of pixels per clock cycle is processed. During such mode, the pixels include only depth values. In use, the second number (n) is greater than the first number (m).

Still another system, method and computer program product are provided including a circuit for performing depth testing and blending operations in a first mode and a second mode. Similar to before, in the first mode, the circuit processes a first number (m) of first pixels per clock cycle. Each of the first pixels includes both color values and depth values. In the second mode, the circuit processes a second number (n) of second pixels per clock cycle. Each of the second pixels includes the depth values and not the color values. Further, the second number (n) is greater than the first number (m). In the present embodiment, it is determined whether the circuit is operating in the first mode or the second mode based at least in part on pipeline state information.

In one aspect of the present embodiment, the circuit may include a pixel processor. Moreover, the pipeline state information may be inferred from a plurality of mode bits. Optionally, the determining may be based at least in part on depth information associated with a graphics primitive.

In another aspect of the present embodiment, the color values may be generated by a color value processor in communication with the circuit. As an option, the color value processor may include a programmable processor. For example, the color value processor may be programmable utilizing a program read from graphics memory (e.g. internal or external graphics memory). Still yet, the color value processor may be programmable utilizing a program read by a texture module.

In still another aspect of the present embodiment, the depth values may be generated by a depth value processor in communication with the circuit. Moreover, the color values and the depth values may be outputted to graphics memory in communication with the circuit.

Still another system, method and computer program product are provided including a first circuit (e.g. depth value processor, etc.) capable of interpolating depth values and a second circuit (e.g. color value processor, etc.) capable of interpolating color values and interpolating depth values. In use, the system operates in a first mode and a second mode. In the first mode, a first number (m) of first pixels is processed per clock cycle. Each of the first pixels includes an interpolated color value from the second circuit and an interpolated depth value from the first circuit. In the second mode, a second number (n) of second pixels is processed per clock cycle. At least a portion of the second pixels includes an interpolated depth value from the second circuit. In use, the second number (n) is greater than the first number (m).

In the context of any of the previous embodiments, a stencil function may be performed. For example, an additional third mode of operation may be provided. During such third mode, third pixels are processed each including stencil information.

These and other advantages of the present invention will become apparent upon reading the following detailed description and studying the various figures of the drawings.

BRIEF DESCRIPTION OF THE DRAWINGS

Prior Art

DESCRIPTION OF THE PREFERRED EMBODIMENTS

Figure 1:
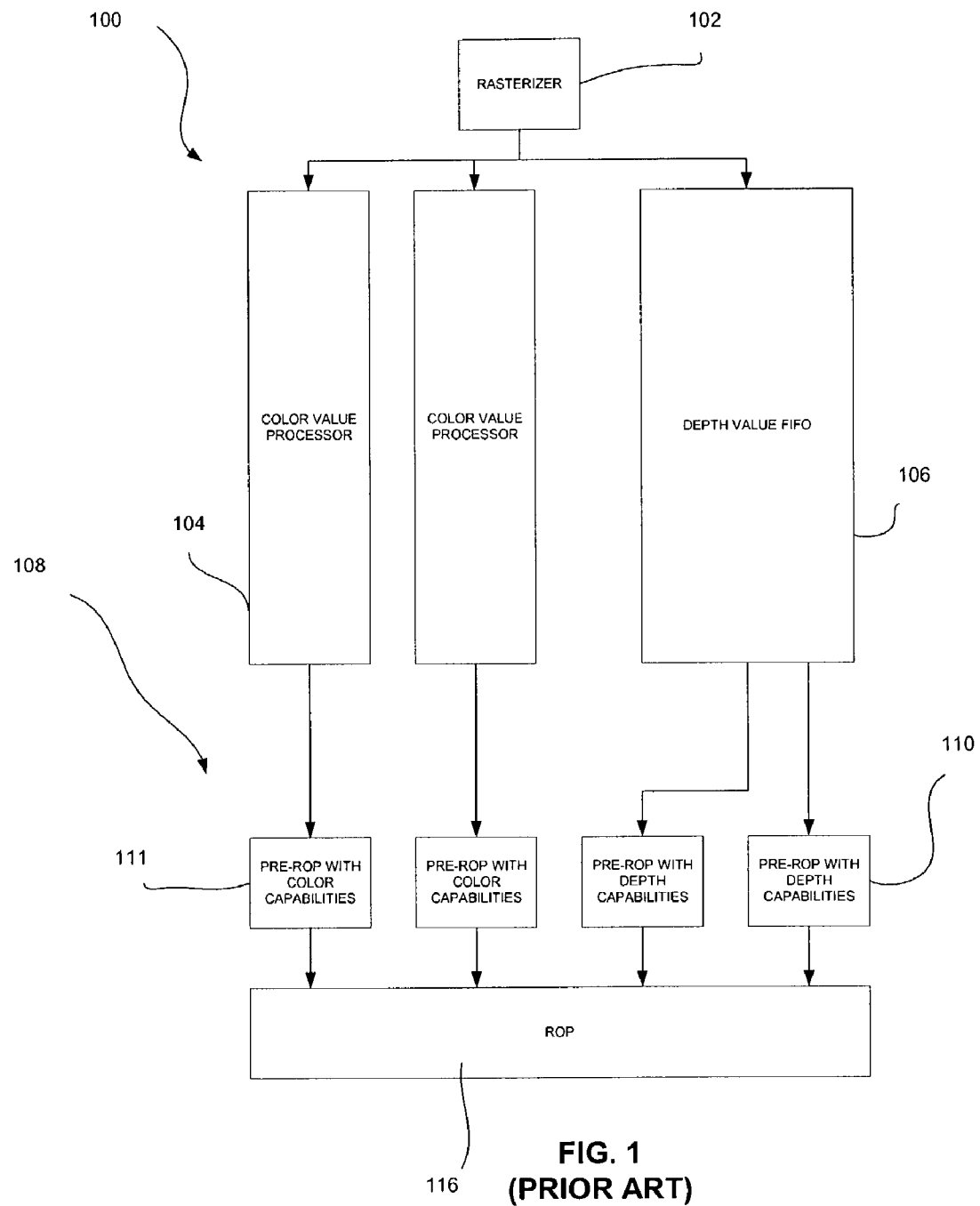
FIG. 1 illustrates an exemplary portion of a graphics pipeline, in accordance with the prior art.
Figure 2:
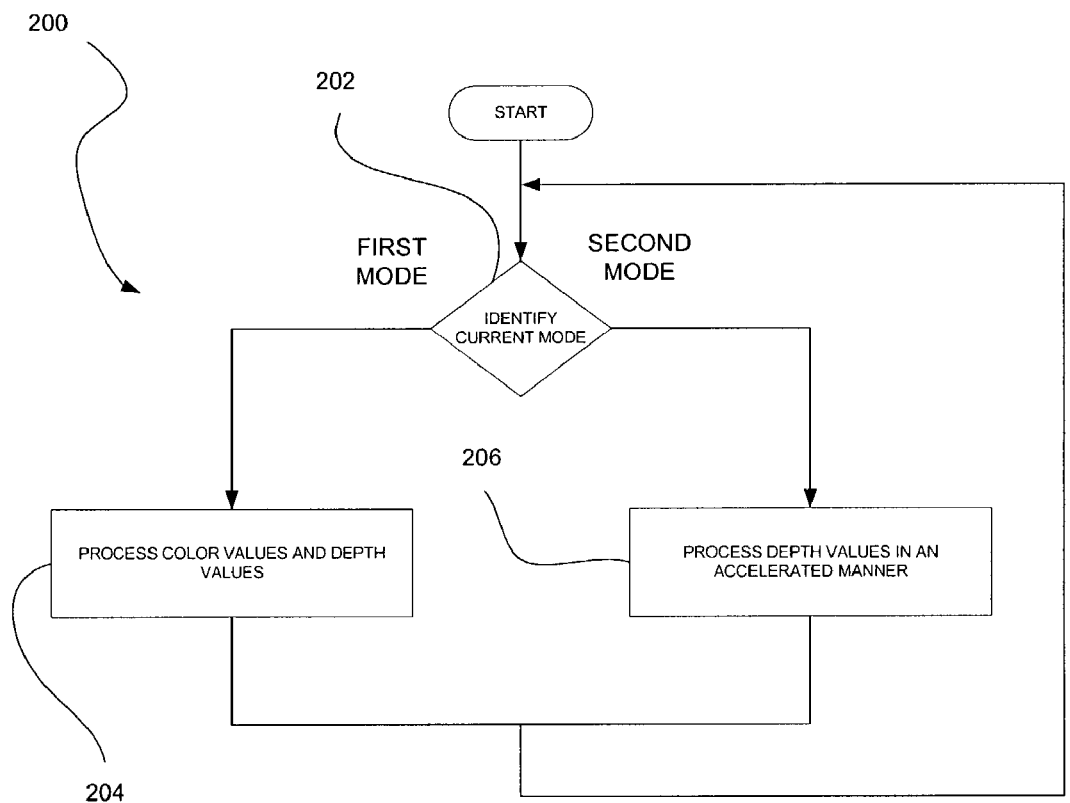
FIG. 2 illustrates a method of enhancing depth value processing, in accordance with one embodiment.

Prior Art FIG. 1 illustrates the prior art. FIG. 2 illustrates a method 200 of enhancing depth value processing, in accordance with one embodiment. The present method 200 operates in at least two modes. A first mode may be included for normal operation when processing resources may be shared between depth value processing and color value processing. Still yet, another mode of operation may be provided for more effectively processing the depth values during graphics processing.

In the context of the present description, a color value may include a r-value, a g-value, a b-value, or any other value relating to a color or lighting aspect of graphics processing. Moreover, a depth value may include a z-value, w-value, or any other value relating to a depth aspect of graphics processing.

In use, the mode in which processing is to occur is initially identified. See decision 202. This may be accomplished in any desired manner. Just by way of example, a software driver and dedicated mode bit may indicate which mode is appropriate to process depth and/or color values. Still yet, the appropriate mode may be inferred from a state of an associated graphics processor, or based at least in part on depth information associated with a primitive. Insight into the state may be inferred from associated mode bits, etc. More information relating to exemplary architectures that may be employed for making such determination will be set forth hereinafter in greater detail. It should be noted, however, that any technique capable of determining an appropriate mode of operation may be employed per the desires of the user.

If it is determined in decision 202 that both color values and depth values require processing, a first mode of operation 204 is initiated. During such operation 204, processing resources may be shared between depth value processing and color value processing.

If, on the other hand, it is determined in decision 202 that only depth values require processing, a second mode of operation 206 is initiated. During such operation 206, processing resources that would normally have been color values processing are dedicated only or at least primarily to depth value processing. A technique is thus provided for processing depth values in a graphics pipeline in an accelerated manner.

It should be noted that the foregoing technique may be accomplished utilizing a wide variety of architectures. A couple of exemplary architectures will now be set forth. It should be understood that such examples are set forth for illustrative purposes only and should not be construed as limiting in any manner.

Figure 3:
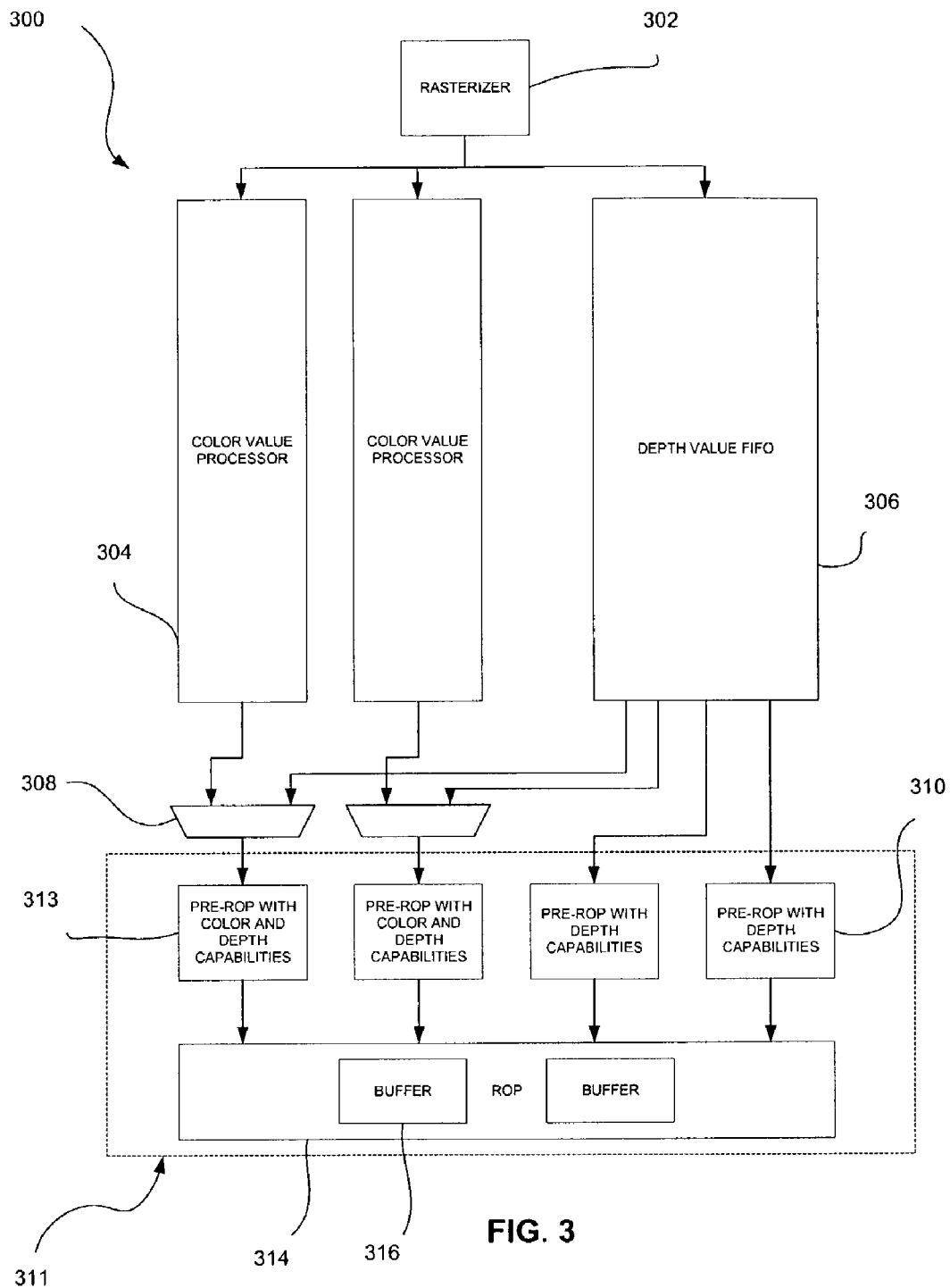
FIG. 3 illustrates an exemplary system for enhancing depth value processing, in accordance with one embodiment.

FIG. 3 illustrates an exemplary system 300 for enhancing depth value processing, in accordance with one embodiment. As an option, the present system 300 may be implemented in the context of the foregoing method 200 of FIG. 2. Of course, however, the present system 300 may be implemented in any desired context.

As shown in FIG. 3, a rasterizer 302 is provided. In general, the rasterizer 302 identifies pixels which belong to a primitive being considered. One particular function of the present rasterizer 302 shown in FIG. 3 is the generation of depth values.

Associated therewith is a plurality of color value processors 304 coupled to the rasterizer 302. In use, the color value processor 304 is capable of generating color values. While two color value processors 304 are shown in FIG. 3, it should be noted that any number (one or more) color value processors 304 may be utilized. Moreover, in the context of the present embodiment, the color value processors 304 may each include a color "pipeline" or any other circuit capable of generating and/or processing color values.

Coupled to the rasterizer 302 is a first-in-first-out (FIFO) buffer 306 for buffering the depth values. Of course, any desired type of buffering technique may be used per the desires of the user.

Also included in the present system 300 is a back-end circuit 311 coupled to the color value processor 304 and further coupled to the FIFO buffer 306. As shown, the circuit 311 includes a plurality of pre-raster operation processor modules configured to work in conjunction with a raster operation processor 314.

To facilitate the operation of the raster operation processor 314, it may be equipped with a plurality of buffers 316. For example, a plurality of buffers 316 may be provided for accumulating the depth values and the color values. Such buffers 316 may be further capable of writing the depth values and the color values from a plurality of groups (e.g. "quads") to memory as a single block.

With continuing reference to FIG. 3, the circuit 311 includes a plurality of pre-raster operation processor modules. First pre-raster operation processor modules 310 are capable of processing only depth values. In particular, such modules 310 may be capable of performing depth testing, culling, etc. in preparation for additional similar processing utilizing the raster operation processor 314. In the context of the present description, the depth testing may involve any processing that involves the depth values.

Second pre-raster operation processor modules 313 are also provided. Unlike the second pre-raster operation processor modules 111 of Prior Art FIG. 1, the present second pre-raster operation processor modules 313 are capable of processing both color values and depth values, for reasons that will soon become apparent. Just by way of example, the modules 313 may perform address translation, dithering, coverage operations, alpha operations, blending operations, etc. in addition to the depth value processing of the first pre-raster operation processor modules 310. In the context of the present description, the blending operations may involve any processing that blends color values in a desired manner.

In one embodiment, the color value processors 304 may be capable of operating on fewer pixels per clock cycle with respect to the rasterizer 302 and/or FIFO buffer 306. In such embodiment, the bandwidth of the color value processors 304 may be adjusted to match that of the depth pipeline during the second mode of operation. For example, the color value processors 304 may be capable of operating on 1 "quad" (e.g. 4 pixels) per 2 clock cycles in the first mode, and 1 quad per 1 clock cycle in the second mode. As an option, the output of the color value processors 304 may simply be discarded during the second mode of operation.

It should be understood that the foregoing configuration of circuit 311 is set for illustrative purposes only. The circuit 311 may be designed in any manner capable of processing depth and/or color values.

The present system 300 is further equipped with a pair of multiplexers 308 for feeding the output (e.g. depth values, etc.) from the FIFO buffer 306 to the second pre-raster operation processor modules 313. By this design, the multiplexers 308 work in conjunction with the dual processing functionality of the second pre-raster operation processor modules 313 to enable the dual mode operation outlined in FIG. 2. As an option, outputs of the multiplexers 308 may be coupled to the pre-raster operation processor modules via additional circuitry or memory.

In use, during a first mode of operation, depth values are fed from the rasterizer 302 through the FIFO buffer 306 and solely to the first pre-raster operation processor modules 310. Thus, depth values are processed with a first throughput in the first mode. At any desired time, the system 300 may be prompted to operate in the second mode of operation. Again, this may be accomplished by any desired technique. For example, in the context of the present embodiment, a software driver may utilize a dedicated mode bit to determine that the system 300 should operate in one mode or the other. In one embodiment, such mode bit may switch operation to the second mode when no color value processing is required.

When the second mode is enabled, the depth values are fed from the rasterizer 302 through the FIFO buffer 306 to both the first pre-raster operation processor modules 310 and the second pre-raster operation processor modules 313. Thus, processing of the depth values is accelerated by utilizing the resources formerly utilized for color value processing.

To this end, the circuit 311 processes a first number (m) of first pixels per clock cycle. Each of the first pixels includes both color values and depth values. In the second mode, the circuit processes a second number (n) of second pixels per clock cycle. Each of the second pixels includes the depth values and not the color values. Further, the second number (n) may be greater (e.g. double, greater than double, etc.) than the first number (m).

Figure 4:
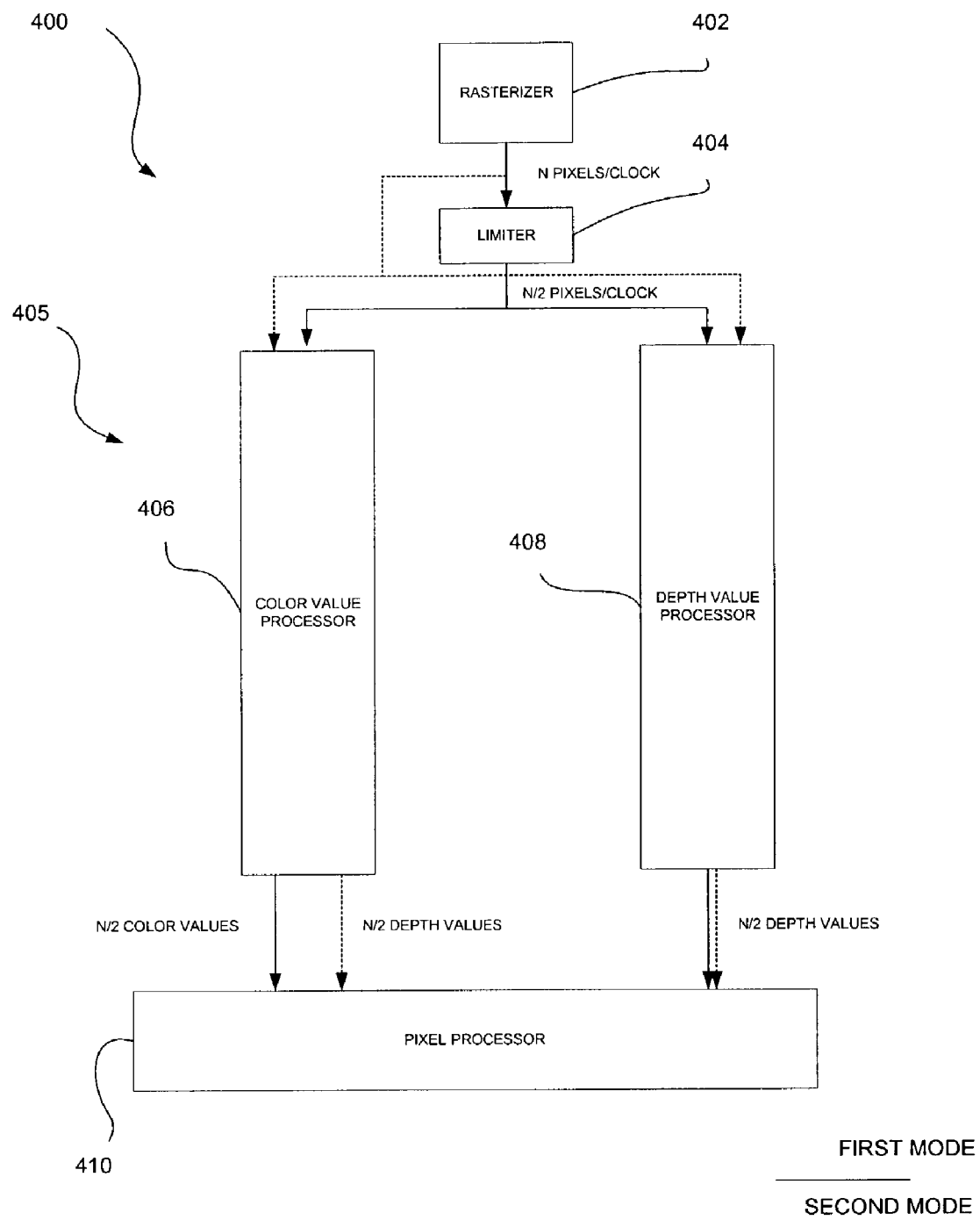
FIG. 4 illustrates another exemplary system for enhancing depth value processing, in accordance with another embodiment.

FIG. 4 illustrates another exemplary system 400 for enhancing depth value processing, in accordance with one embodiment. As an option, the present system 400 may be implemented in the context of the foregoing method 200 of FIG. 2. Of course, however, the present system 400 may be implemented in any desired context.

As shown in FIG. 4, a rasterizer 402 is provided similar to the system 300 of FIG. 3. It should be noted, however, that the present rasterizer 402 may offload any depth value generation/processing to other hardware, as will soon become apparent.

Also shown in FIG. 4 is the fact that the rasterizer 402 outputs N pixels per clock cycle. A limiter 404, or "quad rasterizer," is coupled to the rasterizer 402 for ensuring that pixels are delivered to subsequent processing stages at the rate they can be handled. By this process, the limiter 404 outputs N/2 pixels per clock cycle. Thus, in an exemplary embodiment where the rasterizer 402 may output 8 pixels per clock cycle, the limiter 404 may output 4 pixels per clock cycle.

Coupled to the rasterizer 402 and the limiter 404 is a depth value processor 408 capable of generating depth values. The generation of such values may vary. In one embodiment, the generation of the depth values may include an interpolation procedure. Table 1 illustrates one exemplary interpolation. It should be noted, however, that the depth value processor 408 may include any circuit capable of generating and/or processing depth values.

Table 1

Depth Value=$Ax+By+C$

Also coupled to the rasterizer 402 is a color value processor 406. In one embodiment, the color value processor 406 may include a programmable pixel shader with an associated texture module for fetching textures. As an option, the shader may be a programmable processor. For example, the shader may be programmable utilizing a program read from graphics memory (e.g. internal or external graphics memory). Still yet, the shader may be programmable utilizing a program read by the texture module. In use, the shader may recursively process pixels using a feedback loop, and combine results of such multiple pass algorithms utilizing combiners. It should be noted, however, that the color value processor 406 may include any other circuit capable of generating and/or processing color values.

To enable the dual mode operation set forth in FIG. 2, the color value processor 406 is capable of interpolating not only color values, but also depth values. In particular, only the color values are interpolated by the color value processor 406 during a first mode, and only depth values are interpolated in a second mode. To accomplish this, the processing precision of the color value processor 406 may be augmented to accommodate the depth value processing.

Similar to the depth value processing of the depth value processor 408, the generation of the depth and color values may vary using the color value processor 406. In one embodiment, the generation of depth and color values may include an interpolation procedure. Table 2 illustrates exemplary interpolation equations. It should be noted, however, that the generation of the depth and color values may include any processing involving depth and color values, respectively.

Table 2

Depth Value=$Ax+By+C$

Color Value=$Dx+Ey+F$

The depth and color values of the color value processor 406 and the depth value processor 408 may be fed to a pixel processor 410. In use, the pixel processor 410 may be relied upon for performing functionality similar to that carried out by the circuit 311 of FIG. 3.

Similar to the previous embodiment, the system 400 of FIG. 4 processes a first number (m) of first pixels per clock cycle. Each of the first pixels includes both color values and depth values. In the second mode, the circuit processes a second number (n) of second pixels per clock cycle. Each of the second pixels includes the depth values and not the color values. Further, the second number (n) may be greater (e.g. double, greater than double, etc.) than the first number (m).

In an embodiment where both the color value processor 406 and the depth value processor 408 each process 1 quad per clock cycle, 2 quads of pixels including only depth values may be processed per clock cycle during the second mode of operation.

As mentioned earlier, the determination as to which mode of operation should be applied at any given time may be based on various factors. In one embodiment, such determination may be based at least in part on depth information associated with a graphics primitive. Moreover, the appropriate mode may be inferred from a state of an associated graphics processor. Insight into the state may be inferred from associated mode bits, etc. Table 3 illustrates a set of exemplary conditions that may be required to initiate the second mode of operation.

Table 3 color (RGB) and alpha (A) planes are not written or modified. (e.g. one or more of the following conditions are true)
    RGBA writemasks are all zero
    neither front or back buffers are enabled (NULL rendering surface)
    logicop is enabled and NOOP
    alphablending enabled and logicop disabled, sfactor=ZERO and dfactor=ONE for all color channels, blend equation=ADD or REVERSE_SUBTRACT
1 or 2 samples per pixel (disabled in 4 sample mode)
not in AlphaToOne or AlphaToCoverage modes
smooth primitive rendering disabled (OpenGL smooth modes for AA)
no texkill or depth replace pixel shader instructions
no user clip planes are enabled
colorkey and alphakill are disabled for all active textures
alphatest disabled or alphafunc=ALWAYS
not in one of various framebuffer modes In summary, any mode that may change a color buffer or kill a pixel based on a parameter other than a depth value or stencil value in the pixel processor should not necessarily be run in the second mode of operation. Additionally, any mode that might modify a depth value or stencil value should not necessarily be supported unless there is enough logic to compute such modifications at higher pixel processing rates. Of course, it should be understood that any technique capable of determining an appropriate mode of operation may be employed per the desires of the user.

Figure 5:
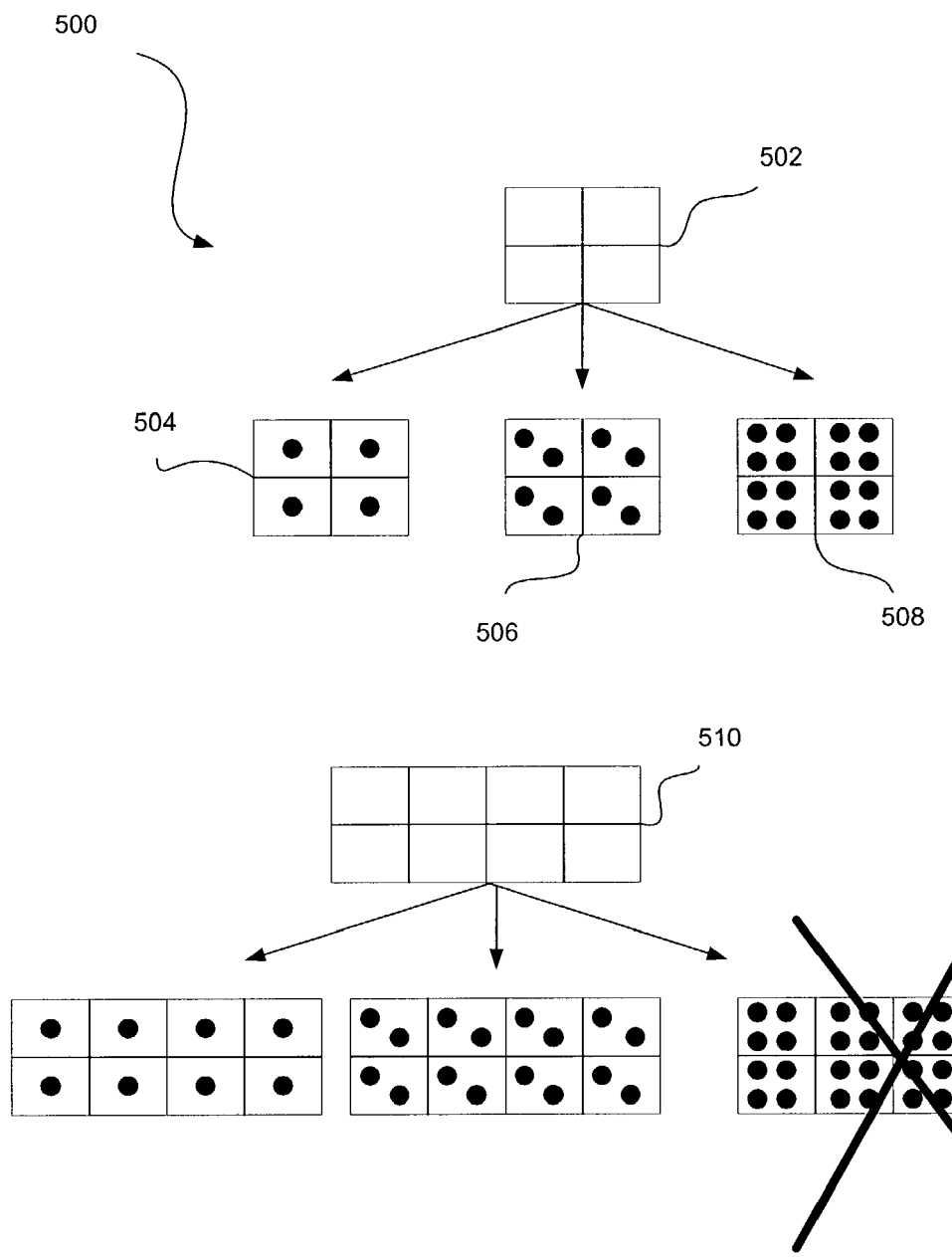
FIG. 5 illustrates a multi-sampling technique associated with one embodiment.

FIG. 5 illustrates a multi-sampling technique 500 associated with one embodiment. As shown, a quad 502 of 4 pixels may be multi-sampled in various ways to improve graphics processing. For example, one sample per pixel may be taken using a first multi-sampling technique 504. Moreover, two samples per pixel may be taken using a second multi-sampling technique 506, and four samples per pixel may be taken using a third multi-sampling technique 508.

In the context of the previous embodiments, it should be noted that a dual-quad 510 of 8 pixels may not necessarily be multi-sampled using the aforementioned third multi-sampling technique 508 due to hardware limitations. Of course, however, such limitations may be simply overcome by increasing hardware resources, etc.

In the context of any of the previous embodiments, a stencil function may be performed. For example, an additional third mode of operation may be provided. During such third mode, a stencil function may be carried out. Specifically, the resources of the graphic system may be used solely or at least primarily for passing stencil data to the back-end of the system. Thus, in the third mode, a third number (p) of pixels is processed. Such third number (p) may be greater than the aforementioned second number (n). As an option, the stencil function may be controlled on a per-pixel or per-tile basis. For example, a stencil-based shadow algorithm (as know in the art) can render depth-only geometry and update the stencil bits based on the result of the depth test, but not write new depth values to the depth buffer. This would normally require the depth processor 408 to generate depth values, even though they are not written to the depth buffer; however, a depth culling process at an earlier stage in the graphics pipeline can indicate that one or more pixels can be guaranteed to pass the depth test. Such a culling process is included herein by reference to a co-pending patent application filed Jun. 19, 2001 under Ser. No. 09/885,665; which is incorporated herein by reference in its entirety for all purposes. When the culling process guarantees some pixels will pass a depth test (or guarantee some pixels will fail a depth test), the corresponding depth values do not need to be computed in the depth value processor 408 because they are not needed. Hence, under these conditions, the color value processor 406 does not generate color values or depth values, and the depth value processor 408 does not generate depth values, either. The pixel processor 410 may update stencil values, requiring a read from graphics memory, followed by writing of the new stencil values (if the values have changed). Since reads and writes of stencil values may need much less bandwidth than depth and/or color, more samples in a stencil-only mode can be processed by the pixel processor 410. Therefore, the third mode has pixels that include stencil values, but not color or depth values, and can process more pixels per clock cycle than the other two modes.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A graphics processing system, comprising:
a circuit for performing depth testing and blending operations in a first mode and a second mode, wherein:
in the first mode, the circuit processes a first number (m) of first pixels per clock cycle, each of the first pixels including both color values and depth values;
in the second mode, the circuit processes a second number (n) of second pixels per clock cycle, each of the second pixels including the depth values and not the color values, the second number (n) being greater than the first number (m).

2. The system as recited in claim 1, wherein the color values are generated by a color value processor in communication with the circuit.

3. The system as recited in claim 1, wherein the depth values are generated by a rasterizer in communication with the circuit.

4. The system as recited in claim 3, wherein the depth values are buffered in a first-in-first-out (FIFO) buffer in communication with the rasterizer and the circuit.

5. The system as recited in claim 1, wherein the color values and the depth values are outputted to graphics memory in communication with the circuit.

6. The system as recited in claim 1, wherein the circuit includes a pre-raster operation processor and a raster operation processor.

7. The system as recited in claim 1, wherein the circuit includes a plurality of buffers for accumulating the depth values and the color values, and writing the depth values and the color values from a plurality of groups as a block.

8. The system as recited in claim 1, wherein the circuit includes a plurality of modules, a portion of the modules being capable of processing both the depth values and the color values.

9. The system as recited in claim 8, wherein multiplexers feed the portion of the modules capable of processing both the depth values and the color values.

10. The system as recited in claim 1, wherein the second number (n) is twice the first number (m).

11. The system as recited in claim 1, wherein the second number (n) is greater than twice the first number (m).

12. The system as recited in claim 1, wherein in the second mode, no color values are outputted.

13. The system as recited in claim 1, wherein a software driver governs whether the circuit is operating in the first mode or the second mode.

14. A graphics processing system, comprising:
means for performing depth testing and blending operations in a first mode and a second mode, wherein:
in the first mode, the means processes a first number (m) of first pixels per clock cycle, each of the first pixels including both color values and depth values;
in the second mode, the means processes a second number (n) of second pixels per clock cycle, each of the second pixels including the depth values and not the color values, the second number (n) being greater than the first number (m).

15. A graphics processing method, comprising:
performing depth testing and blending operations in a first mode and a second mode;
in the first mode, processing a first number (m) of first pixels per clock cycle, each of the first pixels including both color values and depth values; and
in the second mode, processing a second number (n) of second pixels per clock cycle, each of the second pixels including the depth values and not the color values, the second number (n) being greater than the first number (m).

16. A graphics processing system, comprising:
a rasterizer capable of generating depth values; and
a color value processor coupled to the rasterizer, the color value processor capable of generating color values;
wherein the system operates in a first mode and a second mode, where:
in the first mode, the system processes a first number (m) of first pixels per clock cycle, each of the first pixels including both the color values and the depth values;
in the second mode, the system processes a second number (n) of second pixels per clock cycle, each of the second pixels including the depth values and not the color values, the second number (n) being greater than the first number (m).

17. The system as recited in claim 16, wherein the depth values are buffered in a first-in-first-out (FIFO) buffer in communication with the rasterizer.

18. The system as recited in claim 16, wherein the color values and the depth values are outputted to a circuit capable of performing depth testing and blending operations.

19. The system as recited in claim 18, wherein the circuit includes a pre-raster operation processor and a raster operation processor.

20. The system as recited in claim 18, wherein the circuit includes a plurality of modules, a portion of the modules being capable of processing both the depth values and the color values.

21. The system as recited in claim 20, wherein multiplexers feed the portion of the modules capable of processing both the depth values and the color values.

22. The system as recited in claim 16, wherein the circuit includes a plurality of buffers for accumulating the depth values and the color values, and writing the depth values and the color values from a plurality of groups as a block.

23. The system as recited in claim 16, wherein the second number (n) is twice the first number (m).

24. The system as recited in claim 16, wherein the second number (n) is greater than twice the first number (m).

25. The system as recited in claim 16, wherein a software driver governs whether the system is operating in the first mode or the second mode.

26. A graphics processing method, comprising:
generating depth values;
generating color values;
determining whether to operate in a first mode or a second mode;
in the first mode, processing a first number (m) of first pixels per clock cycle, each of the first pixels including both the color values and the depth values; and
in the second mode, processing a second number (n) of second pixels per clock cycle, each of the second pixels including the depth values and not the color values, the second number (n) being greater than the first number (m).

27. A graphics processing system, comprising:
first means for generating depth values;
second means for generating color values; and
third means for determining whether to operate in a first mode and a second mode, where:
in the first mode, a first number (m) of first pixels per clock cycle is processed, each of the first pixels including both color values and depth values;

in the second mode, a second number (n) of second pixels per clock cycle is processed, each of the second pixels including the depth values and not the color values, the second number (n) being greater than the first number (m).

28. A graphics processing system, comprising:
a rasterizer capable of generating depth values;
a color value processor coupled to the rasterizer, the color value processor capable of generating color values;
a first-in-first-out (FIFO) buffer coupled to the rasterizer for buffering the depth values; and
a circuit coupled to the color value processor and further coupled to the FIFO buffer with multiplexers therebetween, the circuit including a pre-raster operation processor and a raster operation processor, the pre-raster operation processor including a plurality of modules, a portion of the modules being capable of processing both the depth values and the color values in a first mode and a second mode, wherein:
in the first mode, the circuit processes a first number (m) of first pixels per clock cycle, each of the first pixels including both color values and depth values;
in the second mode, the circuit processes a second number (n) of second pixels per clock cycle, each of the second pixels including the depth values and not the color values, the second number (n) being greater than the first number (m);
wherein a software driver governs whether the circuit is operating in the first mode or the second mode.

29. A graphics processing system, comprising:
a circuit for performing depth testing and blending operations in a first mode and a second mode, wherein:
in the first mode, the circuit processes a first number (m) of first pixels per clock cycle, each of the first pixels including both color values and depth values;
in the second mode, the circuit processes a second number (n) of second pixels per clock cycle, each of the second pixels including depth values and not color values, the second number (n) being greater than the first number (m);
wherein it is determined by a hardware circuit whether the circuit is operating in the first mode or the second mode, the determining based at least in part on pipeline state information.

30. The system as recited in claim 29, wherein the determining is based at least in part on depth information associated with a graphics primitive.

31. The system as recited in claim 29, wherein the pipeline state information is inferred from a plurality of mode bits.

32. The system as recited in claim 29, wherein the color values are generated by a color value processor in communication with the circuit, the color value processor being a programmable processor.

33. The system as recited in claim 32, wherein the color value processor is programmable utilizing a program read from graphics memory.

34. The system as recited in claim 32, wherein the color value processor is programmable utilizing a program read by a texture module.

35. The system as recited in claim 29, wherein the depth values are generated by a depth value processor and a color value processor in communication with the circuit.

36. The system as recited in claim 29, wherein the color values and the depth values are outputted to graphics memory in communication with the circuit.

37. The system as recited in claim 29, wherein the circuit includes a pixel processor.

38. The system as recited in claim 29, wherein the second number (n) is twice the first number (m).

39. The system as recited in claim 29, wherein the second number (n) is greater than twice the first number (m).

40. The system as recited in claim 29, wherein in the second mode, no color values are outputted.

41. The system as recited in claim 29, wherein the circuit includes a plurality of buffers for accumulating the depth values and the color values, and writing the depth values and the color values from a plurality of groups as a block.

42. A graphics processing system, comprising:
means for performing depth testing and blending operations in a first mode and a second mode, wherein:
in the first mode, the means processes a first number (m) of first pixels per clock cycle, each of the first pixels including both color values and depth values;
in the second mode, the means processes a second number (n) of second pixels per clock cycle, each of the second pixels including depth values and not color values, the second number (n) being greater than the first number (m);
wherein it is determined by a hardware circuit whether the means is operating in the first mode or the second mode, the determining based at least in part on pipeline state information.

43. A graphics processing method, comprising:
performing depth testing and blending operations in a first mode and a second mode;
in the first mode, processing a first number (m) of first pixels per clock cycle, each of the first pixels including both color values and depth values; and
in the second mode, processing a second number (n) of second pixels per clock cycle, each of the second pixels including depth values and not color values, the second number (n) being greater than the first number (m);
wherein it is determined by a hardware circuit whether the method is operating in the first mode or the second mode, the determining based at least in part on pipeline state information.

44. A graphics processing system, comprising:
a first circuit capable of interpolating depth values; and
a second circuit capable of interpolating color values and interpolating depth values;
wherein the system operates in a first mode and a second mode, where:
in the first mode, a first number (m) of first pixels is processed per clock cycle, each of the first pixels including an interpolated color value from the second circuit and an interpolated depth value from the first circuit;
in the second mode, a second number (n) of second pixels is processed per clock cycle, at least a portion of the second pixels including an interpolated depth value from the second circuit, the second number (n) being greater than the first number (m).

45. The system as recited in claim 44, wherein the second circuit is a programmable processor.

46. The system as recited in claim 45, wherein the second circuit is programmable utilizing a program read from graphics memory.

47. The system as recited in claim 45, wherein the second circuit is programmable utilizing a program read by a texture module.

48. The system as recited in claim 44, wherein the color values and the depth values are outputted to a third circuit for performing depth testing and blending operations.

49. The system as recited in claim 48, wherein the third circuit includes a pixel processor.

50. The system as recited in claim 48, wherein the third circuit includes a plurality of buffers for accumulating the depth values and the color values, and writing the depth values and the color values from a plurality of groups as a block.

51. The system as recited in claim 44, wherein the second number (n) is twice the first number (m).

52. The system as recited in claim 44, wherein the second number (n) is greater than twice the first number (m).

53. The system as recited in claim 44, wherein in the second mode, no color values are processed.

54. A graphics processing method, comprising:
interpolating depth values utilizing a first circuit;
interpolating depth values and color values utilizing a second circuit;
in a first mode, processing a first number (m) of first pixels per clock cycle, each of the first pixels including an interpolated color value from the second circuit and an interpolated depth value from the first circuit; and
in a second mode, processing a second number (n) of second pixels per clock cycle, at least a portion of the second pixels including an interpolated depth value from the second circuit, the second number (n) being greater than the first number (m).

55. A graphics processing system, comprising:
a depth value processor capable of interpolating depth values;
a color value processor capable of interpolating color values and interpolating depth values, the color value processor being programmable utilizing a program read from graphics memory by an associated texture module; and
a pixel processor coupled to the depth value processor and the color value processor, the pixel processor capable of processing the depth values and the color values;
wherein the system operates in a first mode and a second mode, where:
in the first mode, a first number (m) of first pixels is processed per clock cycle, each of the first pixels including an interpolated color value from the color value processor and an interpolated depth value from the depth value processor;
in the second mode, a second number (n) of second pixels is processed per clock cycle, at least a portion of the second pixels including an interpolated depth value from the color value processor, the second number (n) being greater than the first number (m).

56. A graphics processing system, comprising:
a circuit for performing depth testing and blending operations in a first mode, a second mode, and a third mode, wherein:
in the first mode, the circuit processes a first number (m) of first pixels per clock cycle, each of the first pixels including both color values and depth values;
in the second mode, the circuit processes a second number (n) of second pixels per clock cycle, each of the second pixels including depth values and not color values, the second number (n) being greater than the first number (m);
in the third mode, a third number (p) of the third pixels is processed, each of the third pixels including a stencil value and neither the color value nor the depth value, the third number (p) being greater than the second number (n).

57. The system as recited in claim 56, wherein the circuit can change between the first mode, the second mode, and the third mode on a per-clock-cycle basis.

58. A graphics processing system, comprising:
a first circuit capable of interpolating depth values; and
a second circuit capable of interpolating color values and interpolating depth values;
wherein the system operates in a first mode, a second mode, and a third mode where:
in the first mode, a first number (m) of first pixels is processed per clock cycle, each of the first pixels including an interpolated color value from the second circuit and an interpolated depth value from the first circuit;
in the second mode, a second number (n) of second pixels is processed per clock cycle, at least a portion of the second pixels including an interpolated depth value from the second circuit, the second number (n) being greater than the first number (m);
a third number (p) of the third pixels is processed, each of the third pixels including a stencil value and neither the color value nor the depth value, the third number (p) being greater than the second number (n).

59. The system as recited in claim 58, wherein the first pixels and second pixels include a stencil value.

* * * * *